United States Patent [19]

Garcia

[11] 4,077,769

[45] Mar. 7, 1978

[54] PROCESS FOR OBTAINING MATERIALS HAVING LOW CONTENT OF SOLUBLE ELEMENTS FOR MULTIPLE APPLICATIONS

[76] Inventor: D. Santos Garcia, c/o Ma Diaz de Haro 42, Bilbao, Spain

[21] Appl. No.: 651,785

[22] Filed: Jan. 23, 1976

[30] Foreign Application Priority Data

Jan. 27, 1975 Spain .................................. 434.175

[51] Int. Cl.$^2$ ............................................. B08B 3/08
[52] U.S. Cl. ........................................ 8/137; 8/158; 252/8.6
[58] Field of Search ...................... 8/137, 158; 252/8.6

[56] References Cited

U.S. PATENT DOCUMENTS

| 246,547 | 8/1881 | Patterson et al. | 8/158 |
| 986,332 | 3/1911 | Weiss | 8/158 |
| 2,362,871 | 11/1944 | Wardwell | 8/158 |
| 2,524,219 | 10/1950 | Bersworth | 8/137 |
| 3,023,132 | 2/1962 | Diamond et al. | 8/158 |
| 3,467,489 | 9/1969 | Zanussi | 8/158 |
| 3,997,292 | 12/1976 | Lutes et al. | 8/158 |

*Primary Examiner*—William E. Schulz
*Attorney, Agent, or Firm*—Karl W. Flocks

[57] ABSTRACT

Procedure for obtaining materials with a low content of soluble elements for multiple applications involving the treatment of deionized water inside a suitable tank evacuating the water, centrifugating the fibers and drying them and repeating the cycle according to the maximum number of soluble elements wanted at the end.

5 Claims, No Drawings

PROCESS FOR OBTAINING MATERIALS HAVING LOW CONTENT OF SOLUBLE ELEMENTS FOR MULTIPLE APPLICATIONS

The purpose of the present descriptive statement is to declare the object over which the sole right of exclusive industrial and commercial exploitation is requested all over the national territory, for a Letters Patent, in agreement with the norms on that point contained in the present Statute about Industrial Property. This Letters Patent with the name "Procedure for Obtaining Materials with a Low Content of Soluble Elements, for Multiple Applications" comes to improve the already known techniques for getting solutions which excel the conventional ones as we shall explain in this Statement.

The object of the finding is intended for all those materials, such as fibers, blankets, threads, fabrics, weather strips, . . . etc., made of fibers such as rock wool, amiant, . . . etc., and in general any products of similar characteristics.

Every day is greater in industry the use of different components with characteristics such that their indirect action on the plant and machinery where they are used does not cause secondary disadvantages, such as contamination, accelerated aging, . . . etc., Specifically, and this can be observed more often nowadays, the aforementioned materials are required to have constitutive characteristics and conditions such as to meet a series of predetermined standards, so that, as we said above, their components do not have any substances being able of damaging other devices of the places where they are housed.

Studies carried out in this sense have established a relationship between the amount of soluble elements contained in the aforementioned materials, with the degree of chemical weardown or deterioration suffered by the metallic elements of the plant. This is why, more and more, materials with a low content of soluble elements are required, and this content is variable, depending upon the specific application these materials are going to be given.

However, it is not advisable to forget the excellent specific properties of all these materials, for making insulation and airtight items . . . etc., which, there is no doubt about it, make their use very profitable.

It is obvious that, up to date, this ideal goal, such as is the use of materials with a controlled amount of soluble elements, has not been reached.

With the procedure we are proposing now, you can make elements, made of the aforementioned materials, having a content of soluble ions which meet the highest requirements of safety established for the different cases.

As a, non limiting, example of a product made of the mentioned fibers, let us point out those products which can present a content of chloride ions lower than 15 parts per million, and of fluor ions smaller than 10 parts per million.

With regard to this, let us insist again on the knowledge that the existance of this kind of soluble ions produces corrosion on the metallic parts of the places where they are used because in contact with water they reach the metallic parts. Actually, the presence of these ions has been detected in the neighbourhood of the affected areas.

The corrosive action is very much increased with the presence of oxygen dissolved in water, which originates the phenomenon known with the name of Chloride Ion Stress-Corrosion Cracking which can even cause the breaking of the metallic parts, with the consequent dangers. In some instances, and in spite the concentrations of soluble ions being low, they are enough to concentrate in cracks or areas which are alternatively dry and damp.

All of these dangers are avoided with the object of the present finding applied to those products.

On the other hand, in the usual making of these products we follow a known procedure which is started with the treatment of the fibers, which can be used in their usual state or transformed into other products such as panels, threads, . . . etc., with which, in turn, we can make lots of other products, according to the specific application of the product.

The finding consists of making the product undergo a series of operations at, at least, one of the steps of the procedure. Those operations are:

Treatment of the product with deionized water inside a suitable tank. The product is put in the tank and undergoes a water flow, preferably hot, during a period of time which will depend upon the final application of the product.

Within this initial operation, we must put into effect, according to different variables and depending also upon the kind of fiber used, a series of action possibilities, which may or may not complement each other, but which, undoubtedly, are constitutive of and are included in the basic idea.

Among the action possibilities we can mention, for instance, the use of surface-actives, mixed with water, in variable ratios. The surface-active in general has the mission of facilitating the impregnation of the material to be obtained and can be of the ionic or non-ionic type.

These operations can be complemented with vacuum and pressure cycles, separatedly or both together. The variable vacuum has a specific purpose, and this is what justifies its inclusion in the procedure, to help to take out the microscopic air bubbles trapped between the little fibers, and which usually are an impediment for the free contact between the water and the material to be obtained.

In turn, the pressure makes the penetration of the water into the different cracks easier, obtaining this way a shortening of the time of treatment.

Anyway, it is advisible to stir during the extraction and during the washing operation as that will undoubtedly make the aforementioned extraction easier.

When this operation is over, the remaining water with the content of solubles extracted will be passed through an exchanger so it is regenerated, and so it can be used again with the required guarantees.

The procedure includes afterwards a centrifugation, which is very much advisable, in order to separate the solvent (water) trapped in the product. With this centrifugation we eliminate from the product the soluble elements contained in the dissolvent, which would otherwise remain in the material. It also shortens the drying time.

Finally, you let it dry during the necessary period of time, until the humidity of the material is not greater than that of the neighborhood. It will depend also upon the content of organic matter of the material treated.

At the end of this last step, the product is ready to be included again in the manufacturing process of the element which is being made, with the particularity that the content of solubles is perfectly controlled according to the specific application of the product. In this sense, the procedure will regulate the concentration of solubles the final product will have.

The elements made that way can be used on any plant to which, besides their characteristic purpose, they grant the assurance that their indirect action over the rest of the material is completely eliminated.

Summing up the procedure then to its main points, we shall say that the material undergoes a treatment with dissolvent during the time necessary for taking out from it the necessary number of solubles, depending upon the application which the product is going to be given later on.

During the treatment, the evacuation solvent goes through an exchanger which, regenerating the fluid, allows its subsequent use.

In this initial operation and in function of the characteristics of the fibers, of the faster or slower making, ... . etc., surface-actives, the use of vacuum, pressure, vacuum plus pressure, and also a suitable stirring, are alternated; and all of these alternatives are adopted after studying the products.

Afterwards, the material treated is centrifuged and then it is dried, finishing here the operations.

We want to outstand, after describing the nature and advantages of this finding, its non-limiting character, since the change of the shape, matter or sizes of its constituting parts will not alter its essence at all, provided there is not a substantial variation of the whole.

Likewise, the applicant, following the International Agreements on Industrial Property, states his right to the extension of this request to foreign countries, claiming his priority.

Likewise, the petitioner keeps the right of introducing into the present finding as many improvements as can be derived by means of the request of the corresponding Addition Certificates, in the way marked by the Law.

What is claimed is:

1. A process for obtaining fibrous inorganic materials with a low content of soluble elements comprising treating said fibrous material with deionized water inside a suitable tank to leach soluble elements therefrom, evacuating afterwards the water containing said soluble elements, centrifugating the fibers, and then drying said fibers, the cycle of said steps being repeated according to the maximum quantity of soluble elements desired to be removed.

2. A process according to claim 1, characterized by the addition of a surfaceactive agent to said deionized water.

3. A process according to claim 1, characterized by the fact that there is a pressure inside the tank.

4. A process according to claim 1, characterized by the fact that the deionized water is at a temperature from 40 to 95 centigrade degrees.

5. A process according to claim 1, characterized in that the final drying is carried out at variable temperature and period of time so that the humidity of the fibrous material is not higher than that of equilibrium with the neighborhood humidity.

* * * * *